L. D. LUCAS.
STONE-GLEANER.
No. 173,311. Patented Feb. 8, 1876.
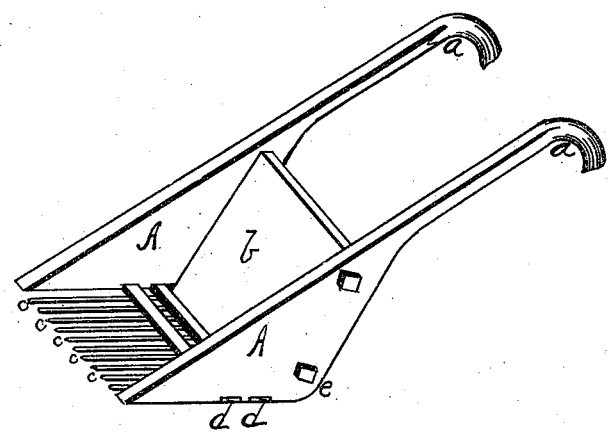
Witnesses:
T. H. Parsons
J. R. Drake
L. D. Lucas
Inventor, By
J. R. Drake
Atty.

UNITED STATES PATENT OFFICE.

LORENZO D. LUCAS, OF CONCORD, NEW YORK.

IMPROVEMENT IN STONE-GLEANERS.

Specification forming part of Letters Patent No. 173,311, dated February 8, 1876; application filed December 27, 1875.

*To all whom it may concern:*

Be it known that I, LORENZO DOW LUCAS, of Concord, in the county of Erie and State of New York, have made certain Improvements in Stone-Gleaners, of which the following is a specification:

This invention is intended for use by farmers and others for picking up loose stones; and it consists in a frame with handles to guide it, and a row of steel teeth or rods attached to and forming the bottom of the frame, projecting forward, so that when the machine is being drawn the teeth will pick up stones and retain them until dumped, as hereinafter explained.

In the drawing, the figure represents a perspective of the device.

A A indicate the two side pieces of the frame, having handles $a\ a$ projecting backward, to be held by the driver to guide the movements of the gleaner as it is drawn over the ground by horses or otherwise. A backboard, $b$, is bolted to the side pieces A A, and the rods or teeth $c\ c\ c$ are suitably attached to bottom cross-pieces $d\ d$, at regular intervals apart, and projecting forward and a little below the frame proper. The points are beveled down to more readily run under the stones. The cross-pieces $d\ d$ are firmly attached to the bottom of the side pieces A A. The frame is made rounding at the two corners $e\ e$, and is so constructed to balance thereby, so that the driver can easily throw up the forward part (with the teeth) by bearing down on the handles $a\ a$, so as to clear very large stones and easily guide the gleaner. A horse or horses will be suitably attached to the front part to draw the device. It is made light, strong, and inexpensive.

I claim—

In a stone-gleaner, in combination with the sides A, provided with handles $a$ and the back $b$, the teeth $c\ c$, extending from the front to the rear of the apparatus at the bottom, and the cross-pieces $d\ d$, the whole constructed and arranged substantially as described.

In witness whereof I have hereunto signed my name in the presence of two subscribing witnesses.

LORENZO DOW LUCAS.

Witnesses:
   J. R. DRAKE,
   T. H. PARSONS.